Oct. 8, 1935.   J. H. FRIDÉN   2,016,424
COLLAPSIBLE TUBE CAPPING MACHINE
Filed Jan. 5, 1934   12 Sheets-Sheet 2

INVENTOR-
John H. Fridén
BY
H. C. [signature]
ATTORNEY-

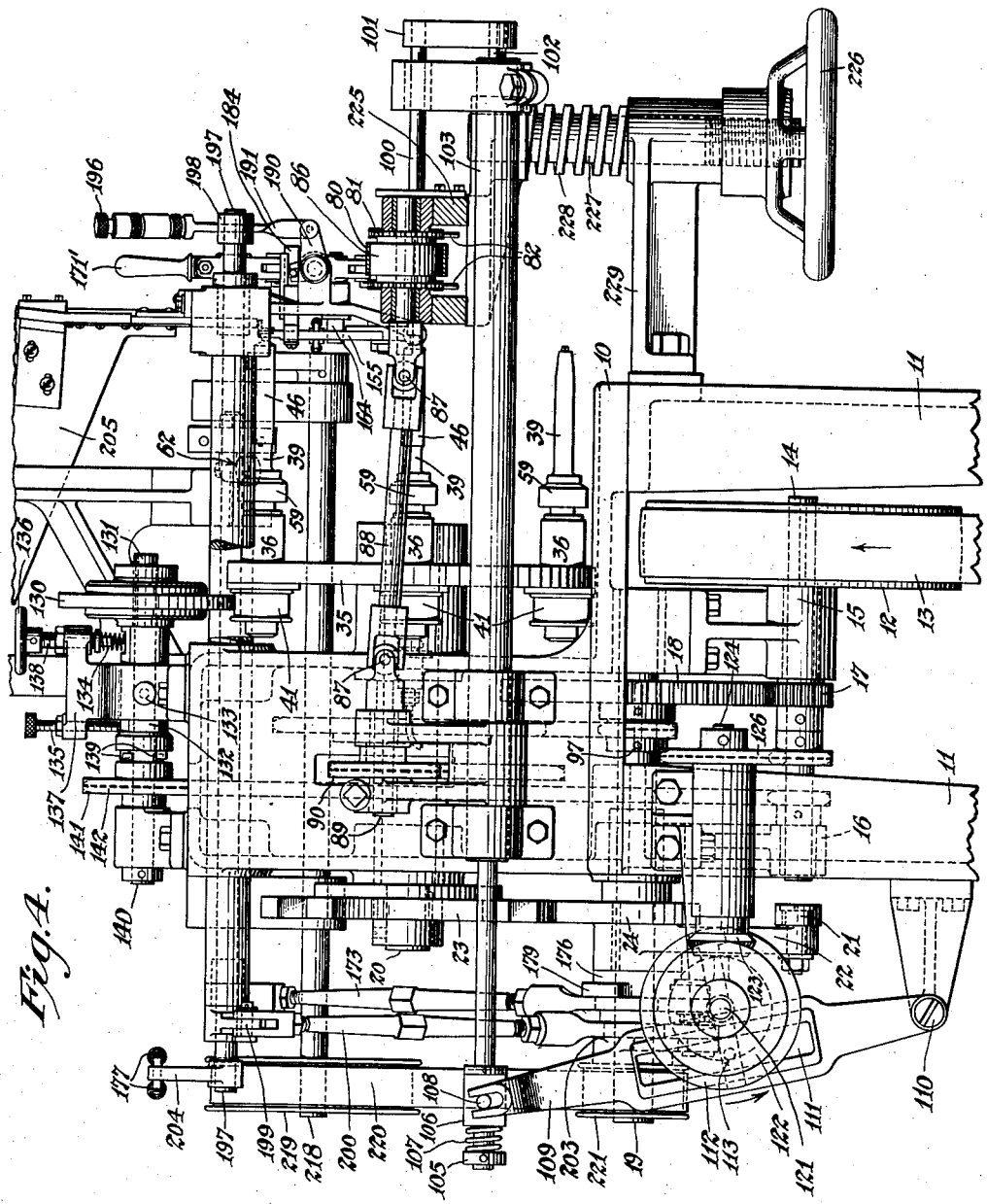

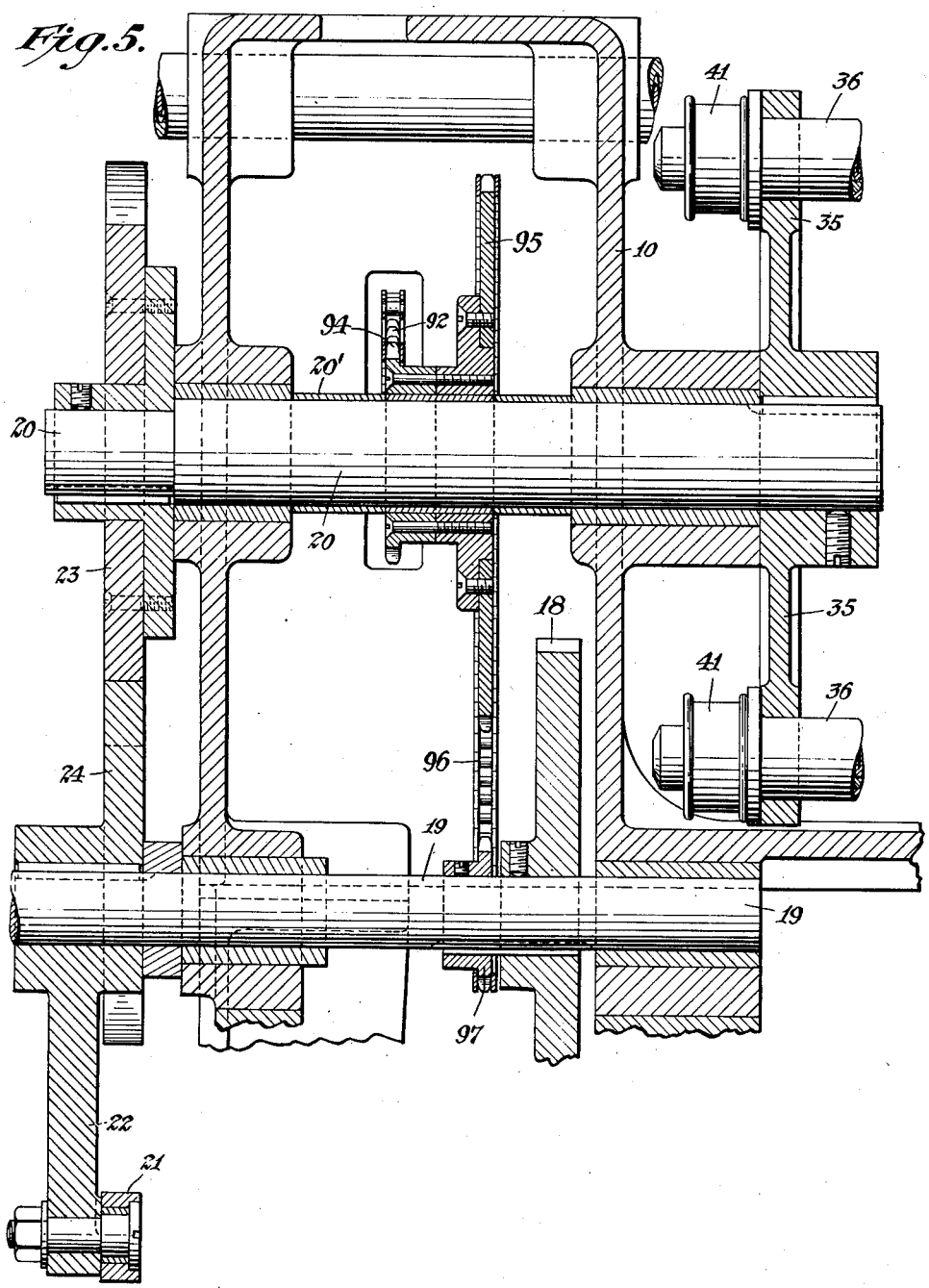

Oct. 8, 1935.  J. H. FRIDÉN  2,016,424
COLLAPSIBLE TUBE CAPPING MACHINE
Filed Jan. 5, 1934   12 Sheets-Sheet 6
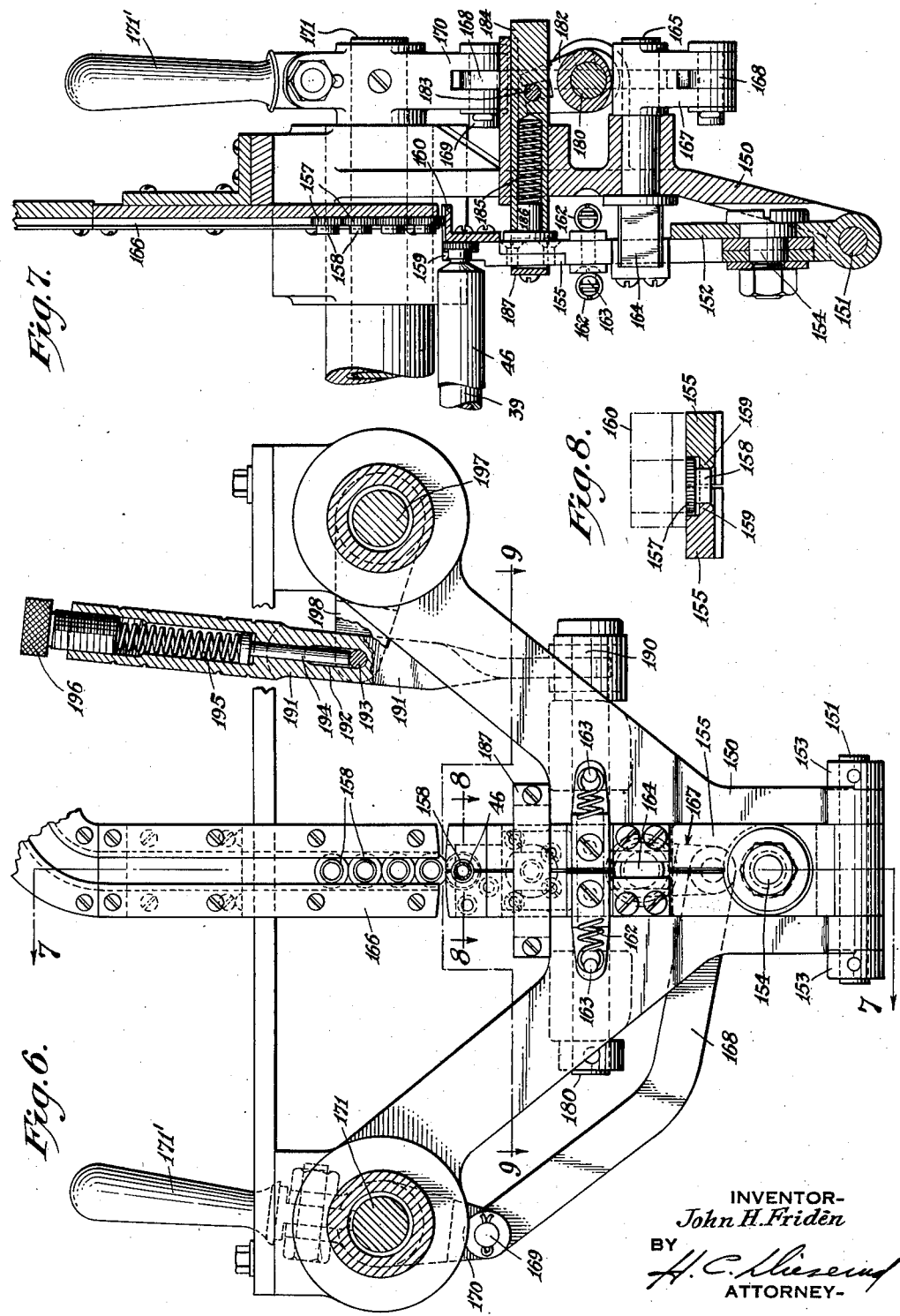
INVENTOR-
John H. Fridén
BY
ATTORNEY- Oct. 8, 1935.  J. H. FRIDÉN  2,016,424
COLLAPSIBLE TUBE CAPPING MACHINE
Filed Jan. 5, 1934  12 Sheets-Sheet 7
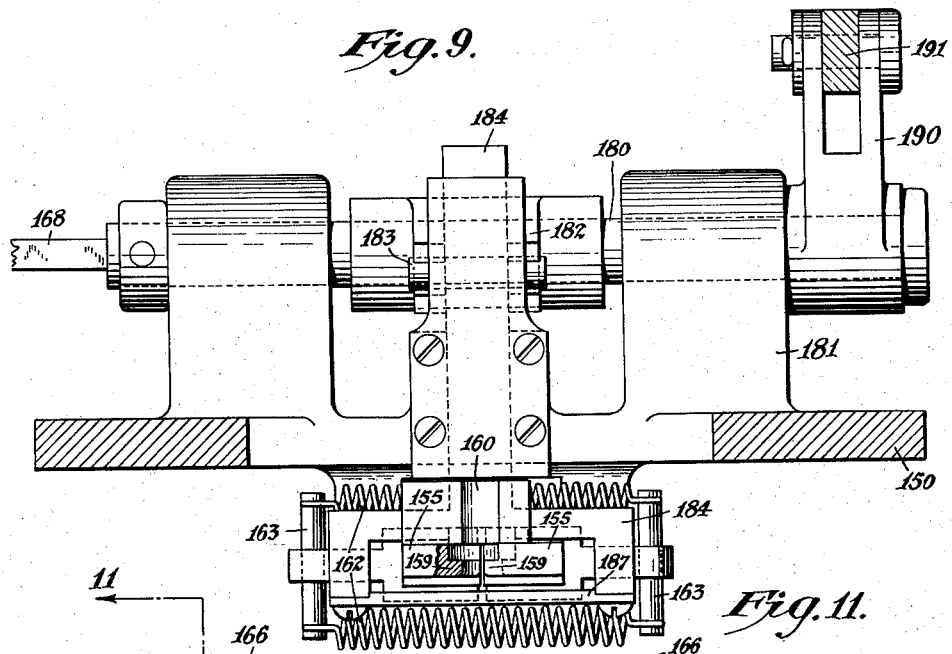
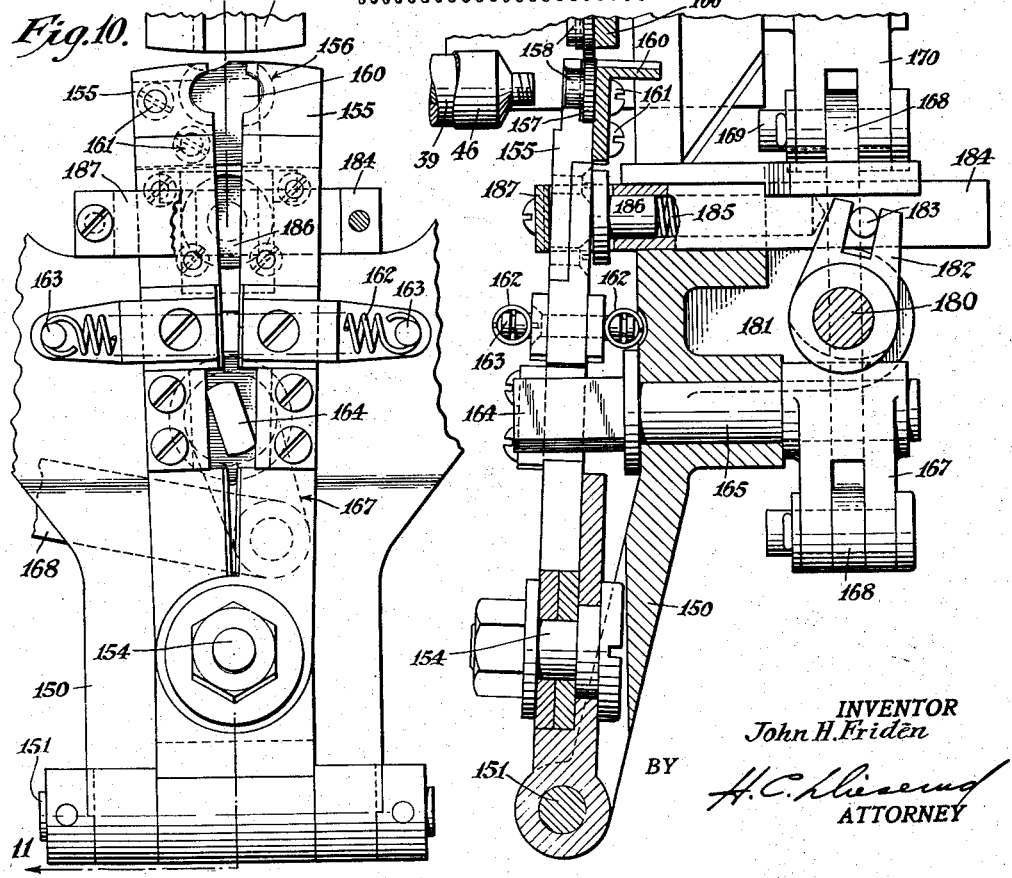
INVENTOR
John H. Fridén
BY
ATTORNEY

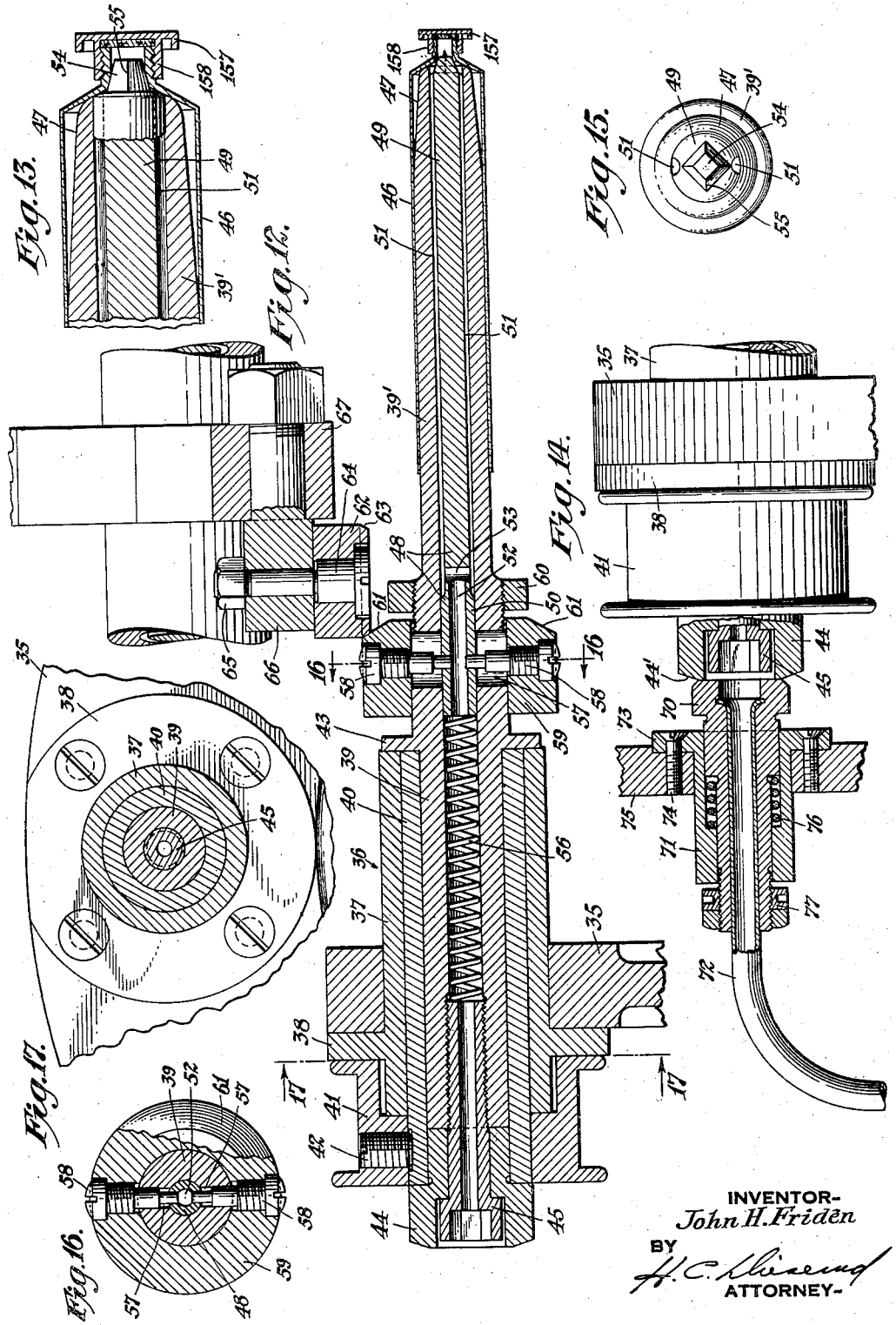

Oct. 8, 1935.  J. H. FRIDÉN  2,016,424
COLLAPSIBLE TUBE CAPPING MACHINE
Filed Jan. 5, 1934   12 Sheets-Sheet 9
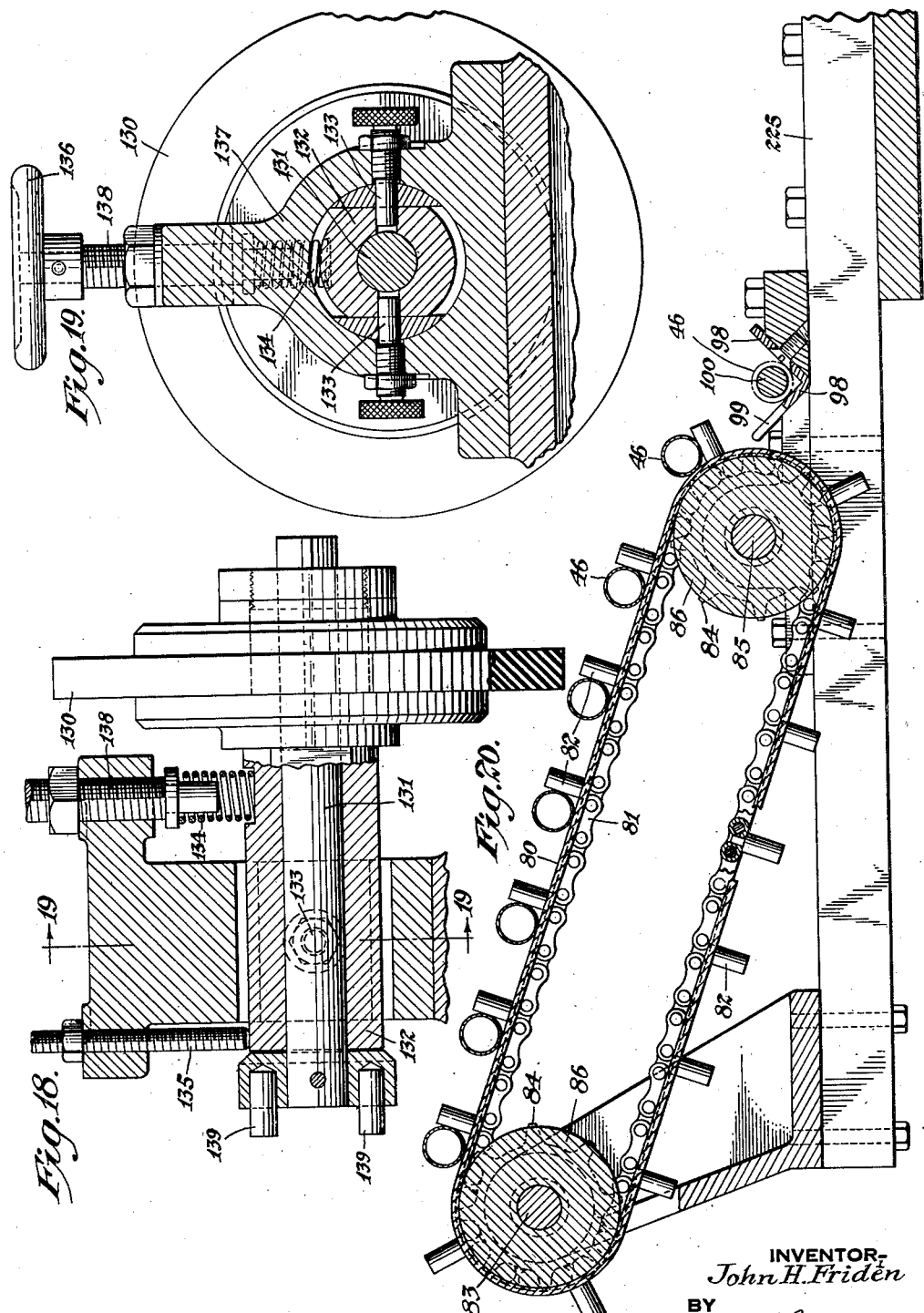
INVENTOR-
John H. Fridén
BY
ATTORNEY-

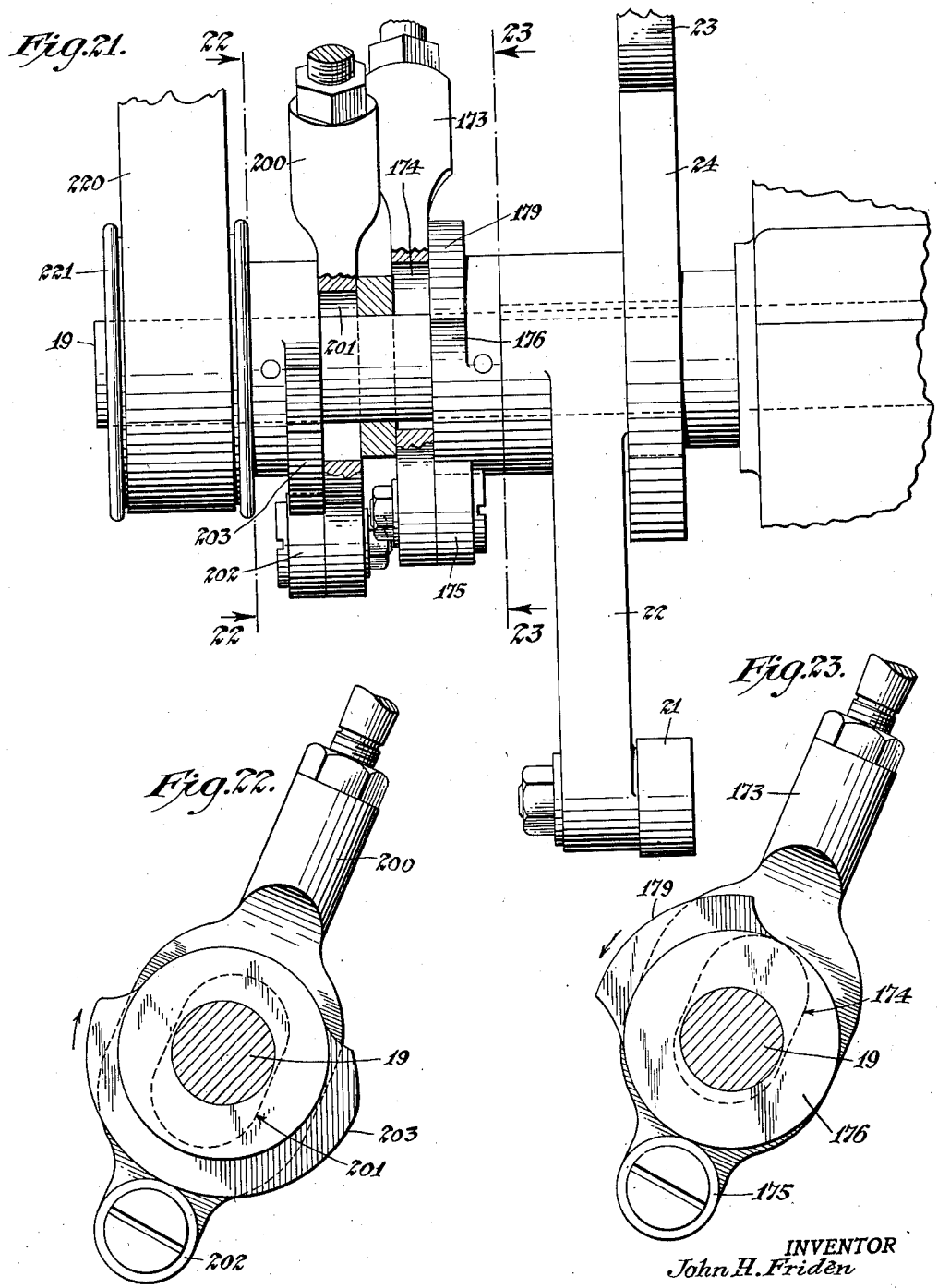

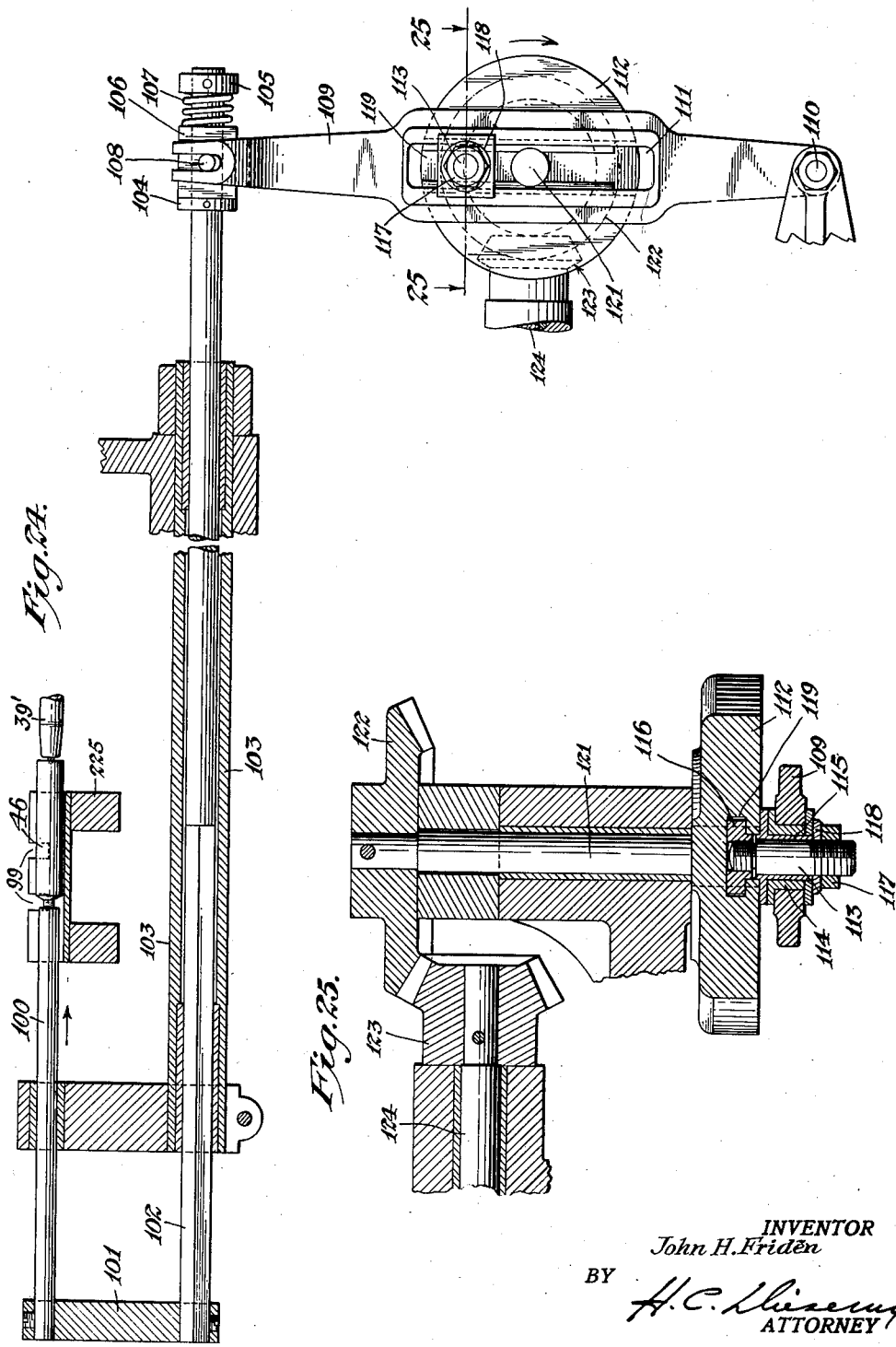

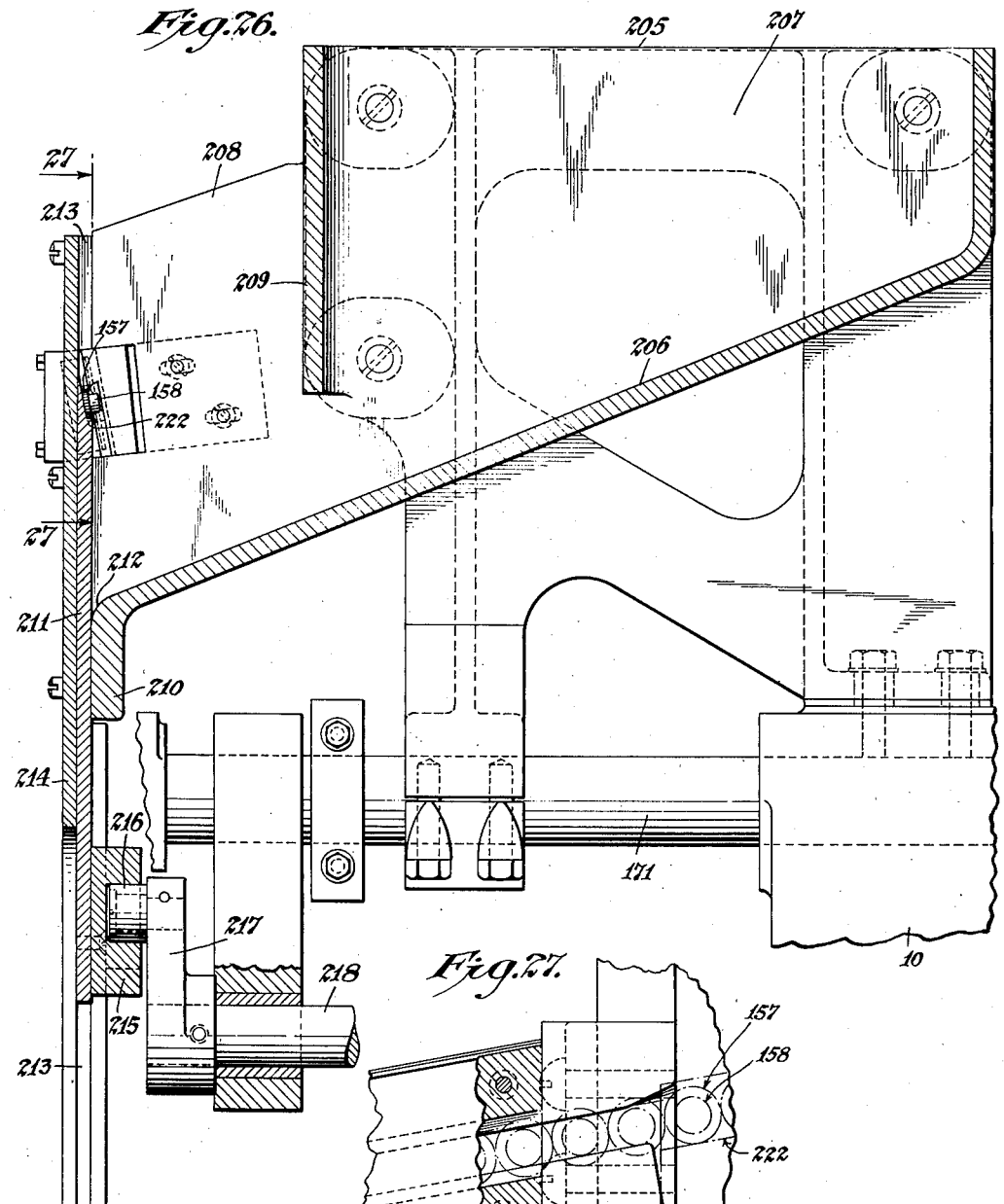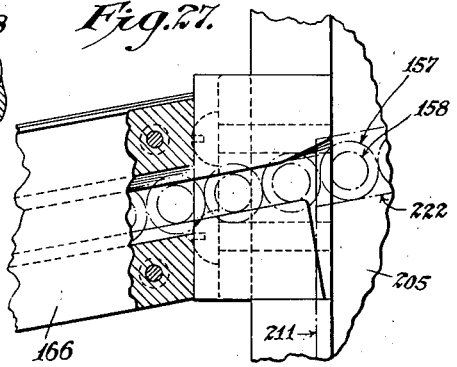

Patented Oct. 8, 1935

2,016,424

UNITED STATES PATENT OFFICE 2,016,424

COLLAPSIBLE TUBE CAPPING MACHINE

John H. Fridén, East Orange, N. J., assignor to The Sun Tube Corporation, Hillside, N. J., a corporation of New Jersey Application January 5, 1934, Serial No. 705,372

18 Claims. (Cl. 29—84)

This invention relates to automatic machinery particularly adapted for attaching caps to the ends of tubular containers. The improved machine is especially suited for operation upon relatively thin walled, deformable, cylindrical members having an open bottom. In this connection a novel capping method has been developed. It will be understood, however, that various phases of the invention are not limited to this particular use but may be applied to a variety of other situations.

The machine embodies a step by step rotary head having a series of work supporting mandrels adapted to be shifted from one to another of a plurality of stations. In one position the articles to be capped are automatically and successively fed from a conveyor onto the mandrels. As the mandrels reach another position they are rotated and caps are automatically urged into position so as to be threaded onto the tube. In a third position the finished articles are automatically discharged. The operating parts are so timed and related that upon each step of rotation of the head a work piece will be placed upon a mandrel, another mandrel will be rotated to effect the capping in cooperation with a cap holding device, and a capped tube will be discharged from a third mandrel.

It has been a primary object of the invention to provide an efficient and compact machine of the character indicated capable of rapidly performing the capping operations, without damage to the tubes. The construction disclosed is particularly applicable to the capping of collapsible tubes such as are commonly employed for marketing shaving cream and tooth paste. Such tubes are filled from the bottom and should therefore be tightly capped to prevent leakage adjacent the cap.

Various other objects and advantages of the invention will be made apparent as an illustrative machine is described in greater detail in conjunction with the accompanying drawings, in which:

Fig. 4 is a side elevation of the machine, from the bottom of Fig. 1.

Fig. 5 is an enlarged detail section on the line 5—5 of Fig. 1 showing the drive for the tube feed conveyor and tube delivery conveyor and the mandrel head.

Fig. 6 is an enlarged detail transverse section on the line 6—6 of Fig. 1 showing the cap clamping and feeding mechanism.

Fig. 7 is a section on the line 7—7 of Fig. 6.

Fig. 8 is an enlarged detail section on the line 8—8 of Fig. 6.

Fig. 9 is an enlarged horizontal section on the line 9—9 of Fig. 6.

Fig. 10 is an elevation on an enlarged scale of a portion of the mechanism shown in Fig. 6 but with the cap jaws open and swung away from the tube.

Fig. 11 is a vertical section on the line 11—11 of Fig. 10.

Fig. 12 is an enlarged section through a tube mandrel when in engagement with the releasing roller for retracting the anchor plunger which effects rotation of the tube with the mandrel.

Fig. 13 is an enlarged detail section through the outer end of the tube mandrel prior to retracting the anchor plunger.

Fig. 14 is a detail section, partly in elevation, of the air connection for blowing the tubes off of the mandrel.

Fig. 15 is an enlarged front elevation of the tube mandrel.

Fig. 16 is a section on the line 16—16 of Fig. 12 with a portion shown in elevation.

Fig. 17 is a section on the line 17—17 of Fig. 12.

Fig. 18 is an enlarged view, partly in section and partly in elevation, of the mechanism for rotating the mandrel and tube to effect the threaded engagement of the cap and tube.

Fig. 19 is a section on the line 19—19 of Fig. 18.

Fig. 20 is an enlarged section on the line 20—20 of Fig. 1 showing the tube feed conveyor.

Fig. 21 is an enlarged, detail, fragmentary, view partly in section, showing a portion of the mechanism of Fig. 4 including the cams for operating the cap jaws.

Fig. 22 is a section on the line 22—22 of Fig. 21, showing the jaw rocking cam.

Fig. 23 is a section on the line 23—23 of Fig. 21, showing the jaw opening cam.

Fig. 24 is a section on the line 24—24 of Fig. 2, but with the parts in another position, showing positive means for positioning the tubes on the mandrels.

Fig. 25 is an enlarged section on the line 25—25 of Fig. 24

Fig. 26 is an enlarged section on the line 26—26 of Fig. 2, showing the cap hopper and slide operating mechanism, and, Fig. 27 is an enlarged detail view on the line 27—27 of Fig. 26.

Figure 3:
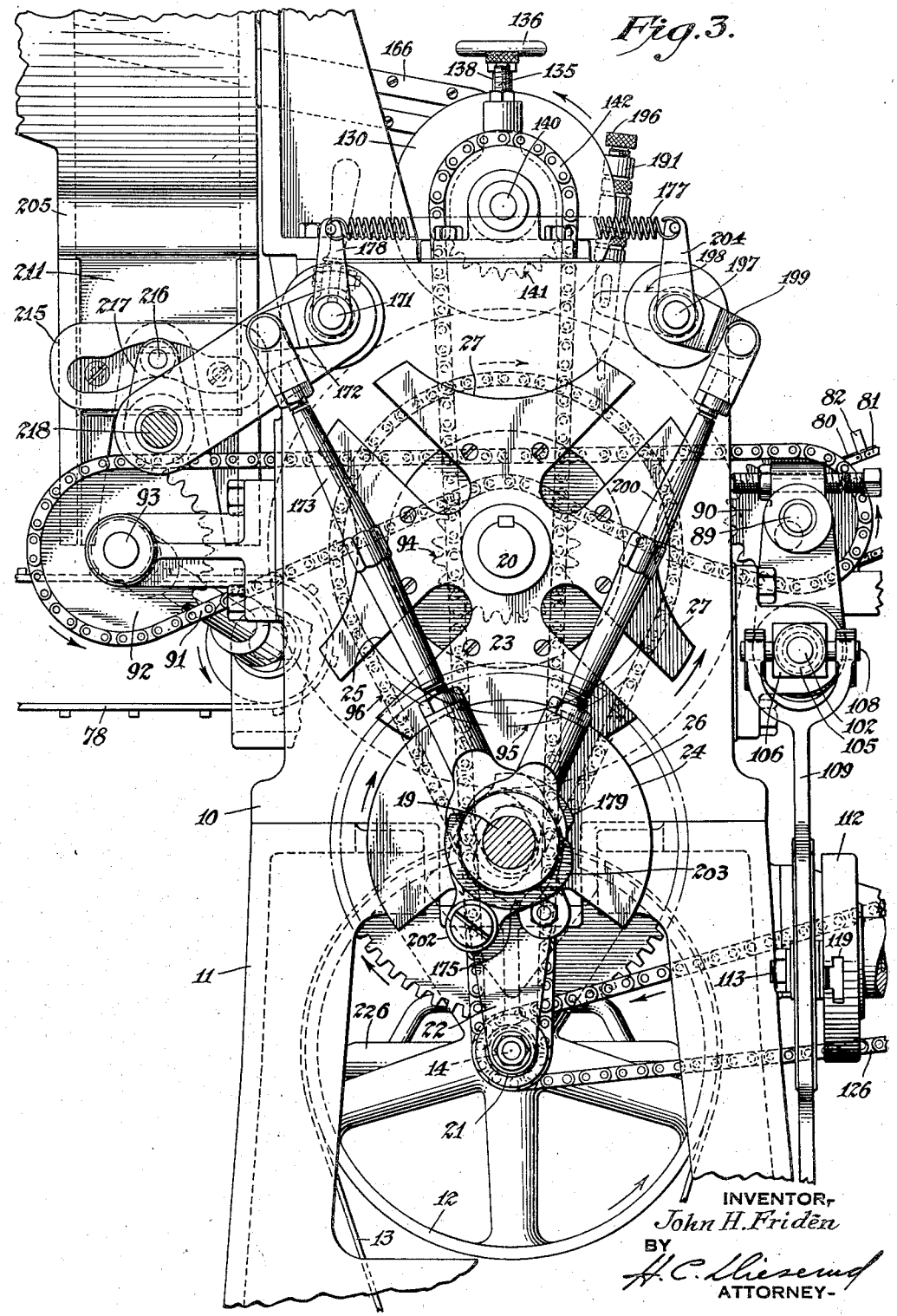
Fig. 3 is an elevation of same on an enlarged scale, looking from the left hand side of Fig. 1.

Referring now to the drawings, particularly Figs. 3 and 4, the machine embodying the invention comprises a supporting frame 10 having suitable legs 11 for holding the mechanism at an appropriate elevation above the floor. Power for the operation of the machine may be derived from any suitable source. For example, a pulley 12 may receive power from a motor or a line shaft through a belt 13. The pulley may be secured to a shaft 14, carried by a bearing bracket 15 (Fig. 4) secured to the frame, and also journaled in a bearing 16. At an intermediate point a pinion 17 is secured to the shaft and meshes with a large gear 18 secured to a shaft 19. Above the shaft 19 there is located a parallel shaft 20. Suitable connections, preferably a Geneva gearing, are provided between the two shafts, the arrangement being such that upon each revolution of the shaft 19 the shaft 20 will be given one step of movement, say a one-quarter turn. This will be accomplished in a corresponding portion of the rotation of shaft 19 and during the balance of the rotation of this shaft the shaft 20 will be held stationary. For this purpose, as best shown in Figs. 3 and 5, a Geneva roller 21 may be carried by an arm 22 secured to the shaft 19 and may cooperate, in well-known manner, with slots or notches 25 in a Geneva wheel 23 secured to shaft 20. A locking disc 24 carried by shaft 19 serves to prevent overthrow of the Geneva wheel and locks it against turning between the successive steps, in the usual way of a Geneva lock. More particularly, as the shaft 19 revolves clockwise or in the direction of the arrow in Fig. 3, the roller 21 will engage one of the slots 25 in the Geneva wheel to rotate the latter one-quarter turn. Four revolutions of the shaft 19 are required, therefore, in the machine disclosed, for each revolution of shaft 20. Except when the roller 21 is turning it, the Geneva wheel 23 will be held stationary by reason of the engagement between the convex surface 26 of the locking disc 24 and one of the concave surfaces 27 of the Geneva wheel. A friction brake, such as a rubber or leather shoe 34 (Fig. 1), may be provided, if desired, to engage the periphery of a chuck plate 35 (hereafter described) to aid in preventing overrunning and to make the operation more uniform.

Secured in any convenient manner to the forward end of shaft 20, as best shown in Fig. 5, is a chuck plate 35 which carries a plurality of tube supporting devices, each designated as a whole as 36. Four of these supporting devices are employed in the machine illustrated, corresponding with the number of steps of movement of the shaft 20 in one complete revolution. If desired a greater or less number of these devices, say 3 or 5, may be employed and the Geneva drive should then be modified accordingly. It will be apparent that the number and arrangement of the devices may be varied to suit particular requirements. One of the supporting devices (all of which are alike) is shown in detail in Figs. 12–17, to which reference will now be had. A sleeve 37 is secured in chuck plate 35 and has a flange 38 abutting against the rear face of the plate. Within the sleeve 37 there is journaled for rotation a hollow or annular mandrel 39 having a bushing 40 shrunk thereon. A pulley 41 is connected to the bushing 40 by means of a set screw 42, to provide for rotation of mandrel 39, as hereafter described. The mandrel may be retained in proper assembly with the other elements by means of an integral flange 43, a headed member 44, and a threaded bolt 45. The member 44 will be described hereinafter in more detail.

The forward end 39' of the mandrel is adapted to receive and support a tube 46, placed thereon as hereafter described, and may be tapered as at 47 to facilitate the operation of sliding a tube onto it. Within the mandrel 39 is an anchor plunger 48, which has a portion 49, provided with longitudinal grooves or air passages 51, and a portion 50 having a central longitudinal passage 52 communicating with passage 51 through a transverse passage 53. The plunger 48 has a head 54 formed with corners 55 for engaging the interior of the neck of the tube to prevent the latter from rotating with respect to the mandrel while a cap is being applied to the tube. A stiff spring 56, interposed between bolt 45 and plunger 48, normally urges the latter into its tube engaging position (Fig. 13).

Figure 1:
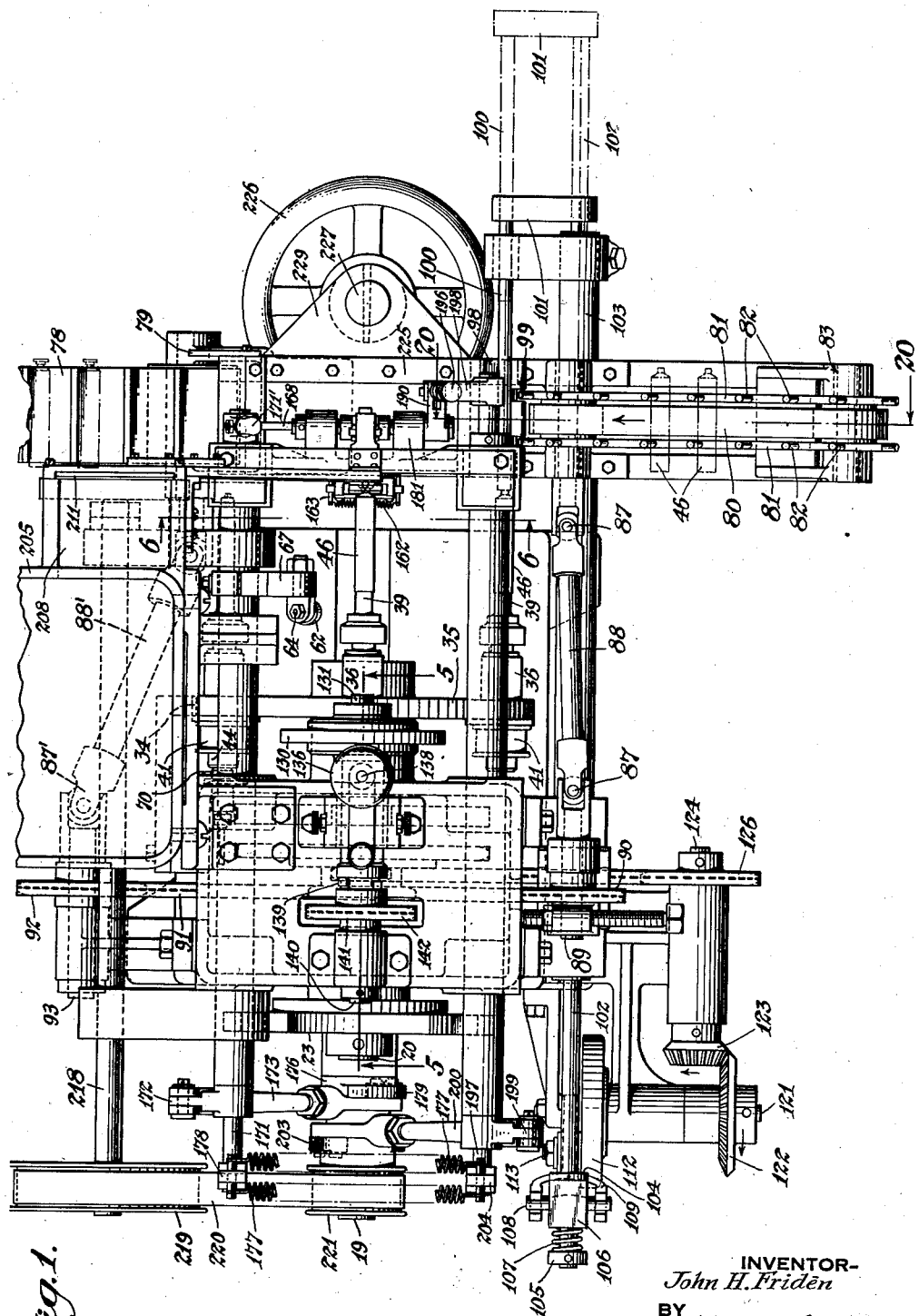
Fig. 1 is a top plan view of the machine with the parts in position in which a cap has just been applied to the tube.
Figure 2:
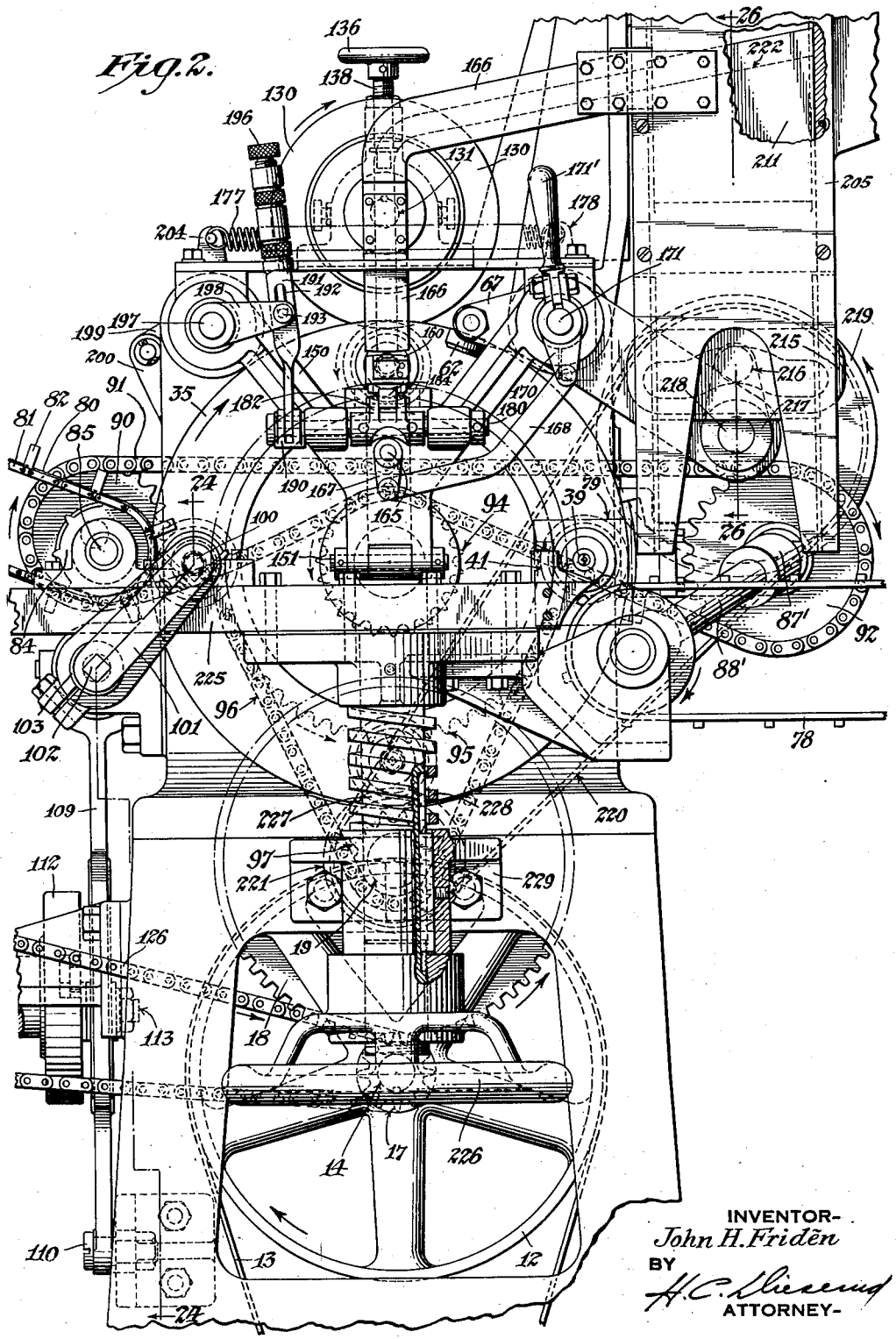
Fig. 2 is an elevation of same on an enlarged scale, looking from the right hand side of Fig. 1.

For retracting the plunger to the position it occupies in Fig. 14, prior to discharging the tube from the mandrel, mechanism of the following character may be employed. The mandrel 39 may be provided with a transverse opening 57 into which project studs 58, threaded into a member 59 which is slidable lengthwise on the outside of the mandrel, the inner ends of said studs engaging the plunger in any convenient manner. A nut 60, threaded on the mandrel in front of the member 59 serves to limit the advance of the plunger under action of spring 56. The member 59 is provided with a beveled surface, as at 61, adapted to be engaged by a roller 62 having a surface 63 for cooperating with surface 61, in order to retract the plunger 49, prior to the discharge of the tube from the mandrel. After the mandrel passes the roller 62 during rotation of chuck plate 35, the plunger will be urged by spring 56 to strike the tube and start it off the mandrel. The roller 62 is journalled for free rotation on a stud 64 supported by nut 65 in an arm 66 carried rigidly with a suitably located stationary portion 67 of the machine. The position of the roller 62 is best shown in Figs. 1 and 2. This is intermediate the capping position and the position at which the tube is removed from the mandrel. In this way time is allowed for the retraction of the plunger and its release to loosen the tube on the mandrel before the tube removing means comes into action.

When the chuck plate 35 is rotated by the Geneva gearing to the position where the capped tube is to be discharged from the mandrel 39, at the right hand side of the machine (Fig. 2), member 44, which is provided with a beveled rear face 44', (Fig. 14) engages the front face of a member 70 which is supported in a stationary sleeve 71 and formed hollow for receiving an air tube 72. The member 71 may be secured through a flange 73 and bolts 74 to a rigid portion 75 of the machine, so as to be aligned with the mandrel in its tube discharging position. A spring 76 urges the member 70 into engagement with member 44 and a nut 77 limits the advance of the member 70 to the extent desired for proper engagement with bevelled face 44' as the mandrel is brought into position. In this manner, a tight joint is effected so that a stream of air under pressure, delivered from any suitable source (not shown), through tube 72, may pass through the interior of the member 44, nut 45, mandrel 39 and through and around the plunger 48 to blow the tube 46 slowly off the same and onto any suitable discharge conveyor mechanism 78 (Fig. 1) for delivery of the capped tubes to a convenient point of discharge. The air may be supplied continuously, or intermittently under control of a valve operated by suitable, properly timed, automatic mechanism (not shown). A bumper 79 (Fig. 1), which may be formed of yielding material such as leather, is preferably employed in line with the blow-off position of the mandrel to prevent over-shooting of the discharge tubes.

We may now consider the means provided for automatically feeding the work pieces successively onto the mandrels at the left hand station in Fig. 2. This mechanism is most clearly shown in Figs. 1–4, 20, 24 and 25. The tubes 46, to be capped, may be deposited in any suitable way, either by hand or automatically, from some other machine or conveyor upon a belt 80. At each side of the belt there may be arranged a chain 81 of suitable construction, carrying a series of spaced, upstanding pins 82. The pins on the two chains should be aligned transversely of the belt, as best shown in Fig. 1. On each chain the pins should be suitably spaced to hold the articles an appropriate distance apart and to permit them to be introduced successively at appropriate intervals into the path of certain operating devices. At their ends the chains are carried by pairs of sprockets 84 secured to shafts 83 and 85 while the belt travels arounds pulleys 86, also secured to these shafts. The arrangement of the belt and chains is such that the tubes will be supported entirely by the belt, free of the chains.

Suitable connections are provided for continuously rotating the inner shaft 85 at an appropriate, relatively slow speed. For this purpose the shaft is connected by a universal joint 87 with a slightly inclined shaft 88, whose opposite end is connected by another universal joint 87 with a short shaft 89 parallel with, but offset from, the inner shaft 85. A sprocket 90 is secured to the shaft 89 and cooperates with a chain 91 which extends transversely of the machine and is supported at its opposite end by means of a sprocket 92 carried by a shaft 93. The bottom course of this chain as it passes from the sprocket 92 to the sprocket 90 is carried over an intermediate sprocket 94 connected in any suitable way to rotate with a large sprocket 95. As best shown in Fig. 5, the sprockets 94 and 95 may both be journaled upon a bushing 20' for free rotation about shaft 20. Sprocket 95 is driven by a chain 96 which is in turn driven by a sprocket 97 secured to the previously mentioned shaft 19. It will be apparent that through the connections explained, the chain 91 will be continuously shifted in the direction indicated by the arrows (Figs. 2 and 3) by power derived from the shaft 19. The rotation thus imparted to the shaft 89, and in turn to the inner shaft 85, will be at a relatively slow speed due to the reduction between the pinion 17 and gear 18 and the further reduction between the sprocket 97 and the sprocket 95. Now, as the conveyor 80 advances, the tube carried by the pins approaching the inner end of the conveyor will be dropped into a V trough 98 carried by a portion of the frame. As best shown in Figs. 1 and 20, a wall of the trough is notched, as indicated at 99, to permit the pins to pass through as the tube is deposited in the trough. The discharge conveyor 78 may be operated from the chain 91 and sprocket 92, through connections 87', 88' substantially similar to those through which the feed or delivery conveyor is operated.

After a tube has been placed in the trough, a push-rod 100, which is directly in line with the portion of the tube to which the cap is to be applied, is shifted toward the right (Fig. 24) until it engages the tube and forces the latter onto the mandrel 39' which, at the time, happens to be aligned with the trough, at the left-hand side of Fig. 2. For the purpose of shifting the push rod in this manner, it is carried by an arm 101 secured to a rod 102 parallel with the plunger. The rod 102 passes through and is supported by a tube 103 and is connected at the left-hand side of the machine (Fig. 1) with suitable operating mechanism such as the following. A pair of collars 104 and 105 may be secured to the rod 102 and a block 106 is slidable on the rod between the collars. The rod is normally urged by means of a spring 107, to carry the collar 104 against the block. Pins 108, projecting from the sides of the block, are engaged by the forked extensions of a lever 109 pivoted at its lower end upon a pin 110 carried by a portion of the machine frame. Intermediate its ends the lever 109 is provided with an elongated slot 111. For rocking the lever 109 about its pivot, a disc 112 may have a stud 113 secured thereto by suitable means, said stud being provided with a collar 114 journaled on a flanged sleeve 115 which surrounds the shaft. The collar is free to rotate with respect to the sleeve and shaft and has flat sides which engage the side walls of slot 111. A nut 116 adapted to lie in a slot 119 in the disc 112, is threaded onto the inner end of stud 113 and thus held firmly against shoulders 120, while a nut 117 is threaded onto the outer end of the stud and turned down to urge washer 118 against the outer end of sleeve 115 to hold the stud against linear movement with respect to the disc. In this way, provision is made for adjusting the stroke of push rod 100 by varying the radial distance of the stud from the center of the disc 112.

For the purpose of rotating the disc 112, in the direction of the arrow (Fig. 24), the disc is secured to a shaft 121 journaled in the frame and having a bevel gear 122 secured at its opposite end. A bevel pinion 123, meshing with the gear 122, is secured to a shaft 124, which also has a sprocket secured thereto adjacent its opposite end. This sprocket is connected by means of a chain 125 with a sprocket secured to the shaft 14 that receives power from the pulley 12. It will be apparent that through the connections indicated the lever 109 will be reciprocated once upon each rotation of the disc 112. The movement thus imparted to the rod 102 will be somewhat slower, at its maximum, as it is shifted in the direction to urge a tube onto the mandrel than when it is being retracted due to the fact that the lever arm on member 109, through which the stud 113 acts, is shorter during the retraction of the plunger. While the disc rotates at a constant speed, variations in linear speed of the push rod are obtained in this manner. More specifically, the initial movement of the soft tube onto the mandrel is comparatively slow to avoid damaging the tube if it is not perfectly aligned with the mandrel. Furthermore, since the lever arm of member 109 is increasing as the stud 113 passes through the most effective part of its arc in applying a tube a more uniform action is produced. The spring 107 enables a yielding pressure to be exerted by the plunger against the neck of the tube near the end of the movement of the push rod toward the right in Fig. 24. This spring may if desired, be made of sufficient length to prevent jamming of the parts in the event that the free movement of the plunger toward the right is interfered with. As the tube is forced onto the mandrel by the push rod 100, it is wedged against the corners 55 of the anchor plunger 49 and thus prevented from turning with respect to the mandrel while the latter is being rotated during the capping operation as hereafter described.

After the push rod 100 has been partially retracted, from the tube, the chuck plate 35 will be rotated through a quarter turn by means of the Geneva motion, previously explained, to bring the mandrel on which a tube has been placed to the top center station in the machine (Fig. 2), at which point the pulley 41 connected to this particular mandrel will be carried into cooperation with a friction wheel 130 adapted to engage the surface of the pulley, within the groove. As shown in detail in Figs. 18 and 19, friction wheel 130 is secured to a shaft 131 carried by a frame 132 pivotally supported through pins 133 upon a portion 137 of the main frame. A spring 134, bearing downwardly upon the frame 132 forwardly of its pivot, serves to yieldingly press the friction wheel 130 into engagement with the pulley 41. The clockwise movement of the frame 132 (Fig. 18) may be suitably limited by means of a set screw 135. Any suitable means, such as a hand-wheel 136 secured to a stud 138 threaded into main frame portion 137, may be provided to vary the tension of the spring 134. A pin drive 139 serves to couple the shaft 131 with a shaft 140 (Figs. 1 and 3) carrying a sprocket wheel 141. This sprocket is driven by a chain 142 operatively connected to drive shaft 14. Through the connections explained, the shaft 131 and friction wheel 130 will be rotated at a suitable speed. This in turn will serve to rotate the particular mandrel which happens to be in the right position at any given time. The speed of rotation will be appropriate for threading the tube into a cap which is urged against the end of the tube by mechanism now to be described.

With particular reference to Figs. 6-11, mechanism, for grasping a threaded cap and urging it toward and into engagement with the threaded end of a rotating tube at one station of the mandrel, comprises a stationary Y-shaped member 150 bolted in convenient manner to a suitable portion of the main frame of the machine. The lower end of member 150 is bifurcated and supports a horizontal shaft 151, upon the central portion of which is journalled a rocker arm 152. The shaft is retained in position by collars 153. Arm 152 carries a bolt 154 adapted to pivotally support a pair of opposed jaw members 155 for opening and closing in a plane generally perpendicular to the axis of the tube or mandrel (Fig. 11). A nut is threaded onto the bolt for maintaining the jaws in assembled relation with the rocker arm. Each of the jaw members 155 is provided at its upper end with a generally semi-circular depression 156, adapted to receive a flange 157 of a cap 158, and with shoulders 159 adapted to lie in front of said flange and grip the cap, tightly enough to substantially prevent rotation of the cap as a tube is being turned into it, best shown in Fig. 8. For the purpose of urging the jaws together a pair of springs 162 is provided, one in front and the other in rear of the jaws, these springs being attached to studs 163 carried by the jaws. After the cap has been applied, it is preferably held tightly enough by the springs 162 to overcome the friction drive of the mandrel, thus insuring that the cap will be screwed up tightly. If desired however, the parts may be so constructed and adjusted that when the cap is fully applied slippage will occur between the cap and the jaws rather than between the mandrel and friction wheel. A flanged plate 160, secured to one of the jaw members by bolts 161, is arranged to lie in back of the cap 158, for purposes hereinafter mentioned.

For opening the jaws, a cam element 164 is located between the jaws at a suitable point and is formed rigid with a rock shaft 165 pivoted in the member 150. When it is desired to open the jaws to receive a cap from a chute 166, the lower end of which is directly above the top of the jaws, the shaft 165 is rocked through a suitable angle by mechanism of the following character. An arm 167 secured to shaft 165 is pivotally connected to a link 168 in any convenient manner, and this link is pivoted in turn, as at 169 (Fig. 6), to an arm 170 carried rigidly with a shaft 171, which is mounted in one arm of the Y-shaped member. For the purpose of rocking shaft 171, there is secured thereto an arm 172 to which is connected a link 173, as best shown in Fig. 3. The lower end of this link is provided with an elongated opening 174 (Fig. 23) surrounding the shaft 19. A roller 175, rotatably mounted upon the lower end of the link cooperates with a cam 176 secured to the shaft 19. The roller is held against the cam by means of a pair of springs 177 (Fig. 1) connected to an arm 178 secured to the shaft 171. As will be seen best in Fig. 4, the springs 177 tend to lift the link 173 and hold the roller against the cam. It will be recalled that the shaft 19 is continuously rotated by the gearing 17, 18, which connects it with the drive shaft 14. It will be apparent that as the cam 176 rotates in the direction indicated by the arrow in Fig. 23, the roller 175 will be engaged by the cam surface 179 at a predetermined time and caused to urge the link 173 downwardly, thus overcoming the action of spring 177 and opening the jaws 155 in timed relation with the other operations, as hereinafter described. The link 173 may be provided with a turnbuckle or other suitable arrangement to vary the effective length of the link or the adjustment of the parts. Where desired, a handle 171' may be secured to shaft 171 for manually opening the jaws, in the event of a jam.

As the shaft 19 continues to rotate and brings a tube bearing mandrel to a position opposite the cap in the jaws, mechanism generally similar to that just described will rock arm 152 forwardly about pivot shaft 151 to bring the cap into engagement with the tube, through connections of the following character. The speed at which the cap is moved toward the tube should be coordinated with the pitch of the threads on the tube and cap and the speed of rotation of the mandrel as the cap is applied. A rock shaft 180 (Figs. 9 and 11) is carried in brackets 181, which may be formed integral with the Y-shaped member 150, and has a forked arm 182 which engages pin 183 on a member 184, which latter is adapted to reciprocate in the Y-shaped member for rocking the jaws about pivot 151. The member 184 is formed hollow for receiving a light spring 185 arranged to urge a flanged plunger or piston 186 against the jaws 155. A plate 187 extends across the front of the jaws and is secured to member 184 so as to permit a limited action of the plunger 186 and not to interfere with the action of the opening and closing of the jaws as described.

The spring 185 is sufficiently strong to urge the jaws forwardly, through abutment with piston 186, while maintaining a clearance (Fig. 11) between the flange on the piston and the portions of member 184 rearward of the flange, so that the cap is resiliently engaged with the tube at least during the initial contact of the cap with the tube, to avoid jamming if the threads do not at once take hold. Thus if the threads on the tube and in the cap are not properly alined as the cap is brought against the end of the tube the spring 185 will simply yield slightly until the threads are alined. The spring 185 is preferably light enough and the movement of slide 184 great enough to permit a firm solid push on the cap after the cap has been fully applied and slippage occurs between the mandrel and friction wheel. It will be noted from Fig. 11 that when the cap contacts the tube the jaws are in a substantially vertical position, so that the axes of tube and cap are aligned.

As a precaution against smashing of caps if a jam should occur, the rock shaft 180 may be operated through resilient means of the following character. An arm 190 (Fig. 9) is secured to the rock shaft and to the end of this arm a link 191 is pivoted and provided with an elongated slot 192 (Fig. 6) cooperating with which is a pin 193. A plunger 194, mounted for sliding lengthwise of the link, has one end bearing against the pin and its other end bearing against a compression spring 195, the force of which may be varied by set screw 196. The pin 193 is carried by an arm 198 secured to a shaft 197. As the shaft is rocked and the pin is moved upwardly (Fig. 6), the link 191 will be moved upwardly thereby rocking the shaft 180 and the upper ends of the jaws 155 are swung toward the rotating mandrel, to engage the cap with the tube. The spring 195 will yield should the caps become jammed in any way. It will be understood that the spring 195 is stronger than spring 185 so the latter will yield first.

The shaft 197, pivoted in a branch of the Y-shaped member, is rocked by mechanism similar to that which rocks shaft 171 for opening the jaws. Referring to Figs. 3 and 22, an arm 199 secured to shaft 197, has pivoted thereto a link 200, of adjustable length, which has an elongated slot 201 near its lower end, surrounding shaft 19. A roller 202 is carried on the end of link 200 for cooperation with a cam 203 secured to shaft 19. The previously described springs 177 are connected to an arm 204 secured to shaft 197 for holding the roller 202 against the cam. When the cam surface, upon continuous rotation of cam 203, by shaft 19, in the direction of the arrows in Fig. 22, engages the roller 202, the jaws are urged forwardly a proper distance and for a requisite time to engage the cap with the tube. The cam is so formed that the jaws are shifted rapidly until the cap is brought against the end of the tube and the balance of the movement is relatively slow, requiring say, about 120° of the cam and being in synchronism with the desired advance of the cap along the threads.

It will be appreciated that the machine performs the following operations and that the contours of the cams 176 and 203 shall be appropriately designed to accomplish the desired synchronized operation of the parts which they control. A cycle of operations in which a tube is capped may be described starting with the stage at which a cap has just been atached to a tube, when the parts take the positions shown in Figs. 6 and 7. Cam 176, which is secured to continuously rotating shaft 19, will thereupon act to force open jaws 155, and immediately thereafter roller 202 will ride down from the high part to the low part of cam 203 and permit springs 177, acting through their connections with plate 187, to swing the jaws 155 clockwise (Fig. 11) about pivot 151. It will be understood that the jaws are opened sufficiently wide at this time to permit them to be freely carried away from the flange of the cap on the tube. As the jaws swing back, the upper surface of flanged plate 160, which serves to prevent caps in the chute 166 from dropping out while the jaws are forward, is retracted and permits a cap to fall into recesses 156, where it is supported by the bottom walls of these recesses and the front face of plate 160, as shown in Fig. 11. Due to the inclination of this face the cap will not tend to tip forwardly. However, tipping of the cap forwardly may be positively prevented, if desired, by so forming the part 179 of cam 176 that the jaws will be partly closed after they have been freed from the cap previously applied. They will then still receive a new cap readily but the flange of this cap will be more definitely retained. Shortly after the new cap is received between the jaws the roller 175 runs off the cam surface 179, or an intermediate surface, if one is provided, and the jaws are fully closed by springs 162 to grip the cap through shoulders 159. As soon as the jaws have swung back clear of the cap on the tube, as above explained, the rotation of shaft 19, through the Geneva mechanism described, advances the mandrel bearing the capped tube to the discharge station of the machine, and at the same time advances a tube to be capped to the capping station. The cam 203 then causes jaws 155 to swing forwardly to cap the new tube, after which operation the foregoing cycle is automatically repeated.

Automatic mechanism (certain features of which are disclosed in my copending application Serial No. 650,850, filed January 3, 1933, to which reference may be had) is provided for maintaining an adequate supply of caps in the chute 166, and one form of such mechanism is illustrated in the drawings, particularly Figs. 1, 26 and 27, as including a hopper 205 having a bottom wall 206, which is inclined at an angle greater than the angle of repose of the caps, say about 30° to the horizontal. The hopper is divided into a main chamber 207 and a smaller chamber 208 by means of a baffle 209 which terminates above the wall 206. When a large body of caps is dumped into chamber 207 certain of them will flow into chamber 208 to fill the latter to the proper level for purposes which will be made apparent. If desired, this flow or level may be varied by means of any convenient form of adjustable gate or valve (not shown) adjacent the wall 209. The lower end of the wall 206 is provided with a flange 210, which lies closely adjacent a vertically reciprocating lifter 211, and the upper surface of wall 206 is curved, for instance, as shown at 212, to aid in positioning the caps for proper engagement by the lifter. The lifter travels in grooves at the ends of wall 214 of the hopper and rides along the latter. For reciprocating the lifter, a lug 215 is secured to the lower end thereof and is adapted to receive a roller 216 carried on a crank arm 217. The crank may be operated by a shaft 218, supported in any convenient manner and rotated through a large pulley 219, a belt 220 and a small pulley 221, which latter is secured to shaft 19 (Fig. 1). It will be understood that by this mechanism the lifter is reciprocated to carry its upper edge from a point below the surface 212 to the position indicated in Figure 26.

The upper end of the lifter 211 is shouldered as at 222 to support caps which present their heads to this shoulder and which are inclined against the upper extension of the lifter in the position shown in Fig. 26. The shoulder is inclined along its length, as shown in Fig. 2 and also in dot and dash lines in Fig. 27. When the lifter 211 rises it engages a number of caps, along its length, and carries such of these caps as happen to be properly seated on shoulder 222 with their heads leaning against the lifter, into position opposite a slot in the chute 166. The inclination of the shoulder, along the upper edge of the lifter may be such that the caps will roll into the chute. An inclination of say 20° will be satisfactory for round headed caps while a greater inclination may be desirable for hexagonal caps or caps with corners. On some strokes of the lifter no caps at all may be picked up, or what caps are picked up may be in such position that they drop off before the lifter has delivered them to the chute, but on the average enough caps are delivered into the chute to keep it supplied at all times while the machine is operating. A satisfactory ratio between the rotation of chuck plate 35, which carries the tubes to be capped, and the rotation of shaft 218, which reciprocates the cap lifter, may be produced by employing pulleys 219 and 221 of suitable diameter, those shown giving satisfactory results for present purposes.

In order that the machine may be adapted for the capping of tubes of different diameters, provision is made for the adjustment of the trough 98. This trough is carried by a table 225 (Fig. 2) which may be lifted or lowered, as desired, by the turning of a handwheel 226. This handwheel has threaded engagement with the lower end of spindle 227 which is secured to the table 225 at its upper end and is adapted to shift the table as the spindle is moved longitudinally by the handwheel. A spring 228 surrounding the spindle and confined between a shoulder on the table and a bracket 229 secured to the frame urges the spindle upwardly until the hand wheel engages the under surface of a hollow extension of bracket 229. The spindle is keyed to the bracket to prevent turning of the spindle. It will be apparent that in this way the table will either be raised or lowered, depending upon the direction of rotation of the handwheel. The shaft 85 at the lower end of the feed conveyor is also carried by the adjustable table so that it will be shifted upon the adjustment of the trough. It will be apparent that when the larger tubes are to be capped, the table 225 will be lowered to the point where the trough will hold a tube with its axis properly aligned with the mandrel. In adapting the machine to act upon tubes of different diameter, it will be necessary, of course, to replace the mandrels by similar structures of proper dimensions.

The operation of the machine has been described so fully in conjunction with the detailed description of the various portions of the machine that further reference to its mode of operation is believed to be unnecessary. It may simply be mentioned by way of summary that the tubes to be capped are successively feed by the delivery conveyor into the trough 98. From this they are fed by the push rod 100 onto the mandrel which at this moment happens to be at the left in Fig. 2. At the same time, the upper mandrel will be rotated and the cap applied, as described. At the same time the tube carried by the right-hand mandrel will be blown off. When these three operations, which are simultaneously conducted, are completed the chuck plate 35 will be rotated a quarter turn and the same operations will be repeated. It will be understood that the timing of the parts is such that upon each step of movement of head 35 the push rod will be reciprocated once, and the cap applying means will be operated once while the upper mandrel will be rotated sufficiently to effect the capping operation. Furthermore, the delivery conveyor will move at the appropriate speed and will be so timed as to drop a new tube into the trough 98 each time the push rod 100 is fully retracted.

While a machine embodying the features of the invention has been described in considerable detail, and a preferred method of operation has been set forth, it will be understood that these are merely for the purpose of clearly illustrating and pointing out the invention and that numerous changes in the form and arrangement of the parts and in the particular mode of operation may be made without departing from the general spirit and scope of the invention.

What I claim is:

1. In a machine of the class described, an intermittently rotatable member, a plurality of tube holding means on said member, means for feeding tubular work pieces onto said holding means at one station of the head, means for rotating another of said holding means at a second station, means for applying a cap to said tube at said second station, means intermediate said second station and a third station for loosening said work pieces on said holding means, means for discharging a capped tube from another of said holding means at said third station, and common means for imparting step by step movement to the head, for operating said feeding means, and for operating said cap applying means.

2. In a machine of the class described an intermittently rotatable member, a plurality of mandrels rotatably mounted on said member, stationary cam means, means to hold tubes on said mandrels against rotation with respect thereto, means on said mandrels cooperating with said cam to release the holding means upon movements of the member, and means for automatically positioning tubes upon and discharging them from the mandrels.

3. In a machine of the class described, a tube supporting mandrel, means for rotating said mandrel, a plunger movable within said mandrel and having an end formed to engage said tube adjacent the end of the mandrel to prevent rotation of the tube with respect to the mandrel, and means to engage said tube with said plunger.

4. In a machine of the class described, a tube supporting mandrel, means for rotating said mandrel, a plunger movable within said mandrel and having an end formed to engage said tube adjacent the end of the mandrel to prevent rotation of the tube with respect to the mandrel, spring means normally urging said plunger into tube engaging position, means to engage said tube with said plunger, and means to disengage said plunger and permit it to strike said tube a sharp blow.

5. In a machine of the class described, a tube supporting mandrel, means supporting said mandrel for rotation, a plunger within the mandrel for holding the tube against rotation with respect to the mandrel, means for withdrawing the plunger to inoperative position, and means for discharging a fluid medium through said mandrel to remove work from the mandrel when said plunger is inoperative.

6. In a machine of the character described, means to grip a cap, means to rotate a tube to which the cap is to be applied, an operating shaft, means connected with said shaft to shift the gripping means and move the cap through an arc toward and into engagement with the tube, and separate means supported independently of the gripping and shifting means connected with the shaft to operate the gripping means.

7. In a machine of the character described, a fixed frame, means to grip a cap, means to rotate a tube to which the cap is to be applied, means to shift the gripping means and move the cap toward and into engagement with the tube, a member carried by the fixed frame and rotatable thereon to open said gripping means, and a common operating shaft with separate connections for shifting the gripping means and opening the same.

8. In a machine of the character described, a fixed frame, means to grip a cap, frictional means to rotate a tube to which the cap is to be applied, resilient yielding means to shift the gripping means and move the cap toward and into engagement with the tube, means to operate the gripping means comprising a member held against bodily movement relative to said frame but rotatable thereon, and a common shaft for operating said frictional means, said resilient means and said operating means.

9. In a machine of the character described, means to grip a cap, means to support a tube to which the cap is to be applied, means for moving the gripping means to bring the cap into engagement with the tube, said moving means being adapted to yield a predetermined, limited extent during initial engagement between the cap and the tube and including resilient means adapted to yield a greater extent subsequent to the initial yielding of the moving means.

10. A machine for capping a hollow, thin-walled, metal tube having a threaded end which comprises means for supporting and rotating the tube, means for resiliently gripping a cap with its axis normally at a slight angle to the axis of said tube supporting means, and means for swinging the cap gripping means through a small angle to carry the mouth of the cap into a plane substantially at right angles to the axis of the tube and into engagement with said tube.

11. In a machine of the class described a pair of cap gripping jaws, resilient means for urging said jaws together, cam means for spreading said jaws, and means for rocking said jaws to carry a cap into engagement with a tube to be capped, said rocking being effected about a pivot spaced some distance from the axis of the tube.

12. In a machine of the class described a pair of cap gripping jaws, a pair of pivot pins at right angles to each other for supporting said jaws, and means for rocking said jaws about one of said pins to grip a cap and about another of said pins to shift the cap into engagement with a tube.

13. In a machine of the class described a tube supporting mandrel, a pair of cap receiving jaws, means for pivotally supporting said jaws, and means for rocking said jaws about the pivot to engage a cap with a tube on the mandrel, said means including a resilient connection adapted to yield until the threads on the cap and tube are brought into proper relation.

14. In a machine of the class described a cap gripping and conveying member comprising a pivotally mounted support, a pair of gripping elements pivoted upon said support, spring means for drawing said elements together, yielding means to rock said support to convey the cap as it is being applied, and cam means for controlling said spring means and yielding means.

15. In a machine of the class described a rotary spindle head, means for turning said head step by step, a plurality of spindles on said head, means carried by said spindles for engaging and retaining tubes against relative turning thereon, and means for withdrawing said retaining means out of engagement with said tubes as the spindles pass a predetermined point during rotation of the head.

16. In a machine of the class described a rotatable spindle head, a plurality of spindles carried thereby, means for rotating said head step by step, means for applying tubes to said spindles at one position thereof, means for engaging and retaining the tubes against relative turning on the spindles, and means for withdrawing said retaining means and freeing the tubes as the spindles are carried into another position and before they arrive at said position.

17. In a machine of the class described a rotatable spindle head, a plurality of spindles carried thereby, means for rotating said head step by step, means for applying tubes to said spindles at one position thereof, means engaged by the tubes in applying them for assisting in retaining the tubes on the spindles, means for rotating the spindles at a second position thereof, means for withdrawing said retaining means out of engagement with said tubes and freeing the tubes without changing the relative angular position of said tubes and spindles as the spindles are carried into another position.

18. In a machine of the class described a rotatable spindle head, a plurality of spindles carried thereby, means for rotating said head step by step, means for applying tubes to said spindles at one position thereof, means movable relative to said spindles for engaging and assisting in retaining the tubes on the spindles, means for rotating the spindles at a second position thereof, means for retracting said retaining means out of engagement with the tubes and freeing the tubes as the spindles are carried into another position, and means for discharging the tubes as the spindles reach the last mentioned position.

JOHN H. FRIDÉN.